Figure 1:
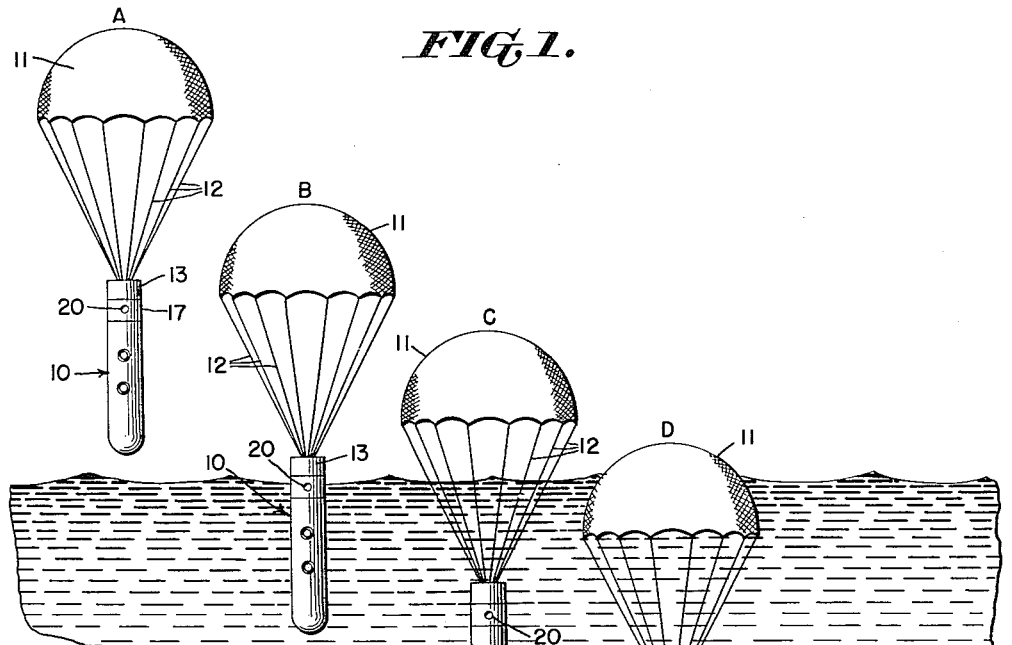

Aug. 23, 1955 — H. W. KLAS — 2,715,872
PARACHUTE RELEASING MEANS
Filed July 3, 1945 — 4 Sheets-Sheet 1

H. W. Klas
By Ralph L. Chappell
Attorney

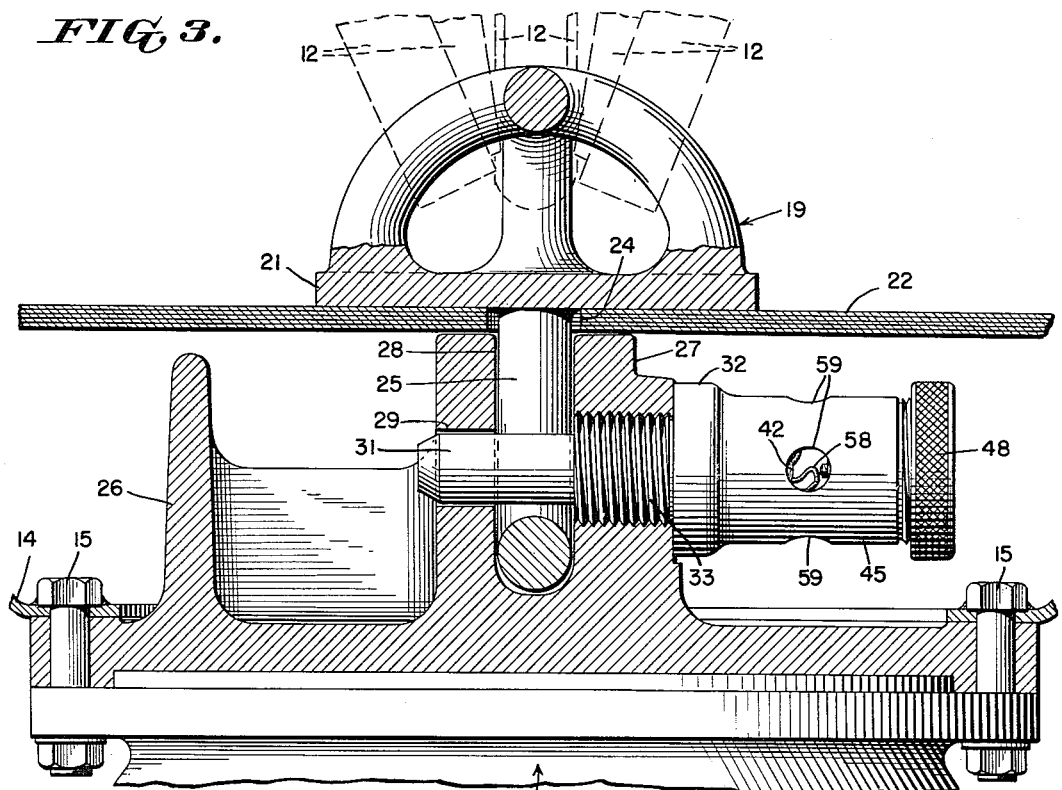
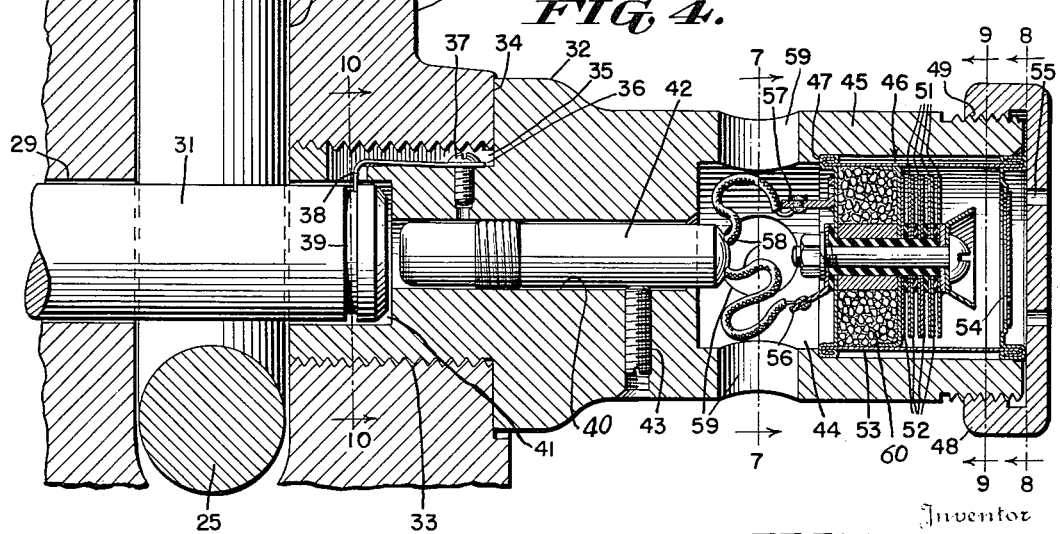

Aug. 23, 1955 H. W. KLAS 2,715,872
PARACHUTE RELEASING MEANS
Filed July 3, 1945 4 Sheets-Sheet 3

Inventor
H. W. Klas
By Ralph L Chappell
Attorney

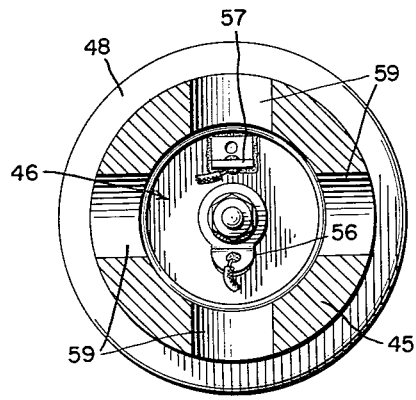
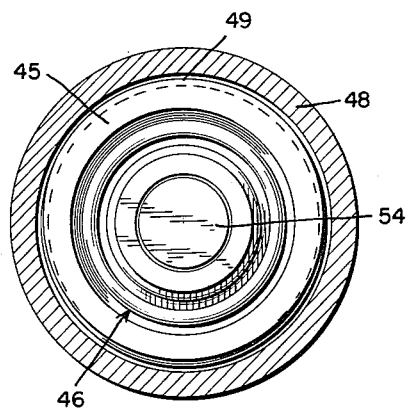
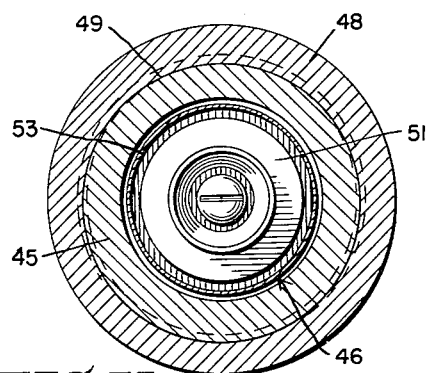
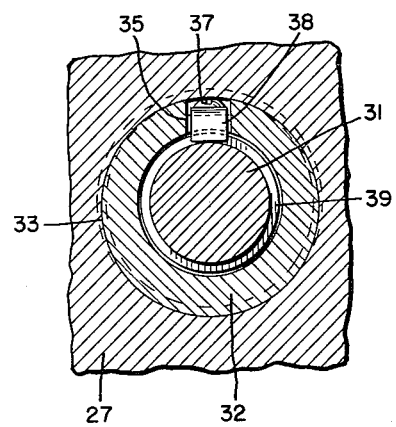
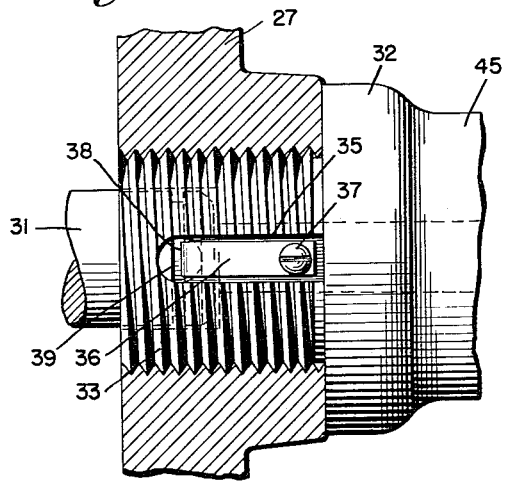

United States Patent Office 2,715,872

Patented Aug. 23, 1955

1

2,715,872

PARACHUTE RELEASING MEANS

Harold W. Klas, Sylvania, Ohio, assignor to the United States of America as represented by the Secretary of the Navy Application July 3, 1945, Serial No. 603,100

8 Claims. (Cl. 102—13)

(Granted under Title 35, U. S. Code (1952), sec. 266)

This invention relates to parachute releasing means and more specifically to a device for releasing the parachute from an aircraft planted marine mine in which the parachute is automatically disconnected from the mine in response to the activation of a sea battery as the mine enters the water.

The invention is particularly adapted for use with aircraft planted marine mines in which the parachute is compactly stowed within a rigid pack secured to the tail of the mine prior to the launching thereof, and in which the parachute is caused to open when the mine is dropped a predetermined distance from the aircraft, thereby to enable the mine to be planted within a target area with a high degree of accuracy. As the mine passes beneath the surface of the body of water during the downward flight thereof, a sea cell is activated thereby generating sufficient electrical energy to fire an electroresponsive detonator and release the parachute from the mine.

Various devices have heretofore been employed for releasing a parachute from a load as the load strikes the surface of the target area in which the inertia of a mass is employed to shear a pin or otherwise interrupt the connection between the parachute and the load. Such devices have been found to be not altogether satisfactory under all conditions of service particularly when employed with a marine mine, for the reason that the reduction in the velocity of the mine as the mine strikes the surface of the water may be insufficient to cause the device to operate and for the further reason that the mine may strike the surface of the water at such an angle that the force of inertia of the mass is applied to the release mechanism at a sufficiently oblique angle as to fail to cause the parachute to be released from the mine.

In the arrangement of the present invention the shroud lines are connected to a releasable support having a downwardly projecting member adapted to be engaged and releasably locked by a pin disposed therein and passing through a complementary member secured to the mine casing thereby providing a clevis for establishing a releasable connection between the parachute and the mine in which the connection is released by the removal of the pin. The pin is forcibly ejected from locking engagement with the support by the explosion of an electroresponsive detonating device arranged in proximate spaced relation therewith and adapted to be fired by electrical power received from a sea cell as the sea cell is activated by the sea water. Means are also provided for releasably locking the aforesaid pin within the release mechanism until the detonator is fired whereby there is no possibility of the pin becoming dislodged and prematurely releasing the parachute from the mine until the detonator is fired by the water coming into contact with the voltage generating elements of the sea cell.

One of the objects of the present invention is the provision of a new and improved release mechanism for detaching a parachute from a load in which the release is effected by the explosion of the charge.

Another of the objects is the provision of new and improved means for releasing a parachute from a load in which the release is effected by firing an explosive charge in response to the activation of a sea cell.

Another object is to provide a parachute releasing mechanism in which the release of the parachute from a load is controlled by the chemical action of an electrolyte as the load strikes a body of water.

Still another object is to provide a release mechanism for a parachute comprising a pistol fired by a sea cell as the load strikes the water and in which a hermetic seal is employed to exclude water and moisture from the sea cell until the seal is ruptured by the force of the water as the load enters the water.

A further object is the provision of means for disconnecting a parachute from an aircraft planted marine mine in which the release of the mine from the parachute is effected invariably as the mine enters the water, regardless of the force of impact of the mine against the water or the angle at which the mine enters the water.

A still further object is to provide a new and improved mechanism for releasing a parachute from a load as the load enters a body of water, which is economical to manufacture, reliable in operation and which possesses all of the qualities of ruggedness and reliability in service.

Still other objects, advantages and improvements will become apparent from the following description taken in connection with the accompanying drawings, of which:

Fig. 1 shows in diagrammatic form the launching of a mine and the release of a parachute therefrom in which the device of the present invention is employed;

Fig. 2 is an enlarged view partly in section and partly broken away of the mine and parachute pack and the parachute release mechanism employed therewith;

Fig. 3 is a greatly enlarged elevational view partly in section and partly broken away of the release mechanism;

Fig. 4 is an enlarged view partly in section and partly broken away of the release mechanism of Fig. 3 showing the explosive means for ejecting the retaining pin from an initial releasable locked position within the device and the sea cell employed therewith;

Fig. 5 is an enlarged sectional view partly broken away taken along the line 5—5 of Fig. 2;

Fig. 6 is an end view partly broken away of the device of Fig. 5;

Fig. 7 is a view taken along the line 7—7 of Fig. 4;

Fig. 8 is a view taken along the line 8—8 of Fig. 4;

Fig. 9 is a view taken along the line 9—9 of Fig. 4;

Fig. 10 is a view taken along the line 10—10 of Fig. 4; and

Fig. 11 is a fragmentary view partly in section of the device for releasably locking the pin in the initial assembled position.

Referring to the drawings on which like numerals of reference are employed to designate like parts throughout the several views and more particularly to Fig. 1 thereof, there is shown thereon a marine mine indicated generally by the numeral 10 of the type known in the art as a ground mine adapted to rest on the bed of a body of water, and provided with a parachute 11, having a plurality of shroud lines 12 for establishing a connection between the parachute and the parachute releasing mechanism of the mine. The mine is provided at the trailing end thereof with a parachute pack comprising a cylindrical skirt 13 within which the parachute is folded prior to the release of the mine from an aircraft in flight, the parachute being adapted to be withdrawn from the skirt in any well known manner as, for example, by a static line, as the mine falls away from the aircraft.

The skirt is supported by a dish-shaped member 14 having an aperture 30 therein and secured to the end of the mine as by a plurality of bolts 15. The dish-shaped member 14 preferably includes a cylindrical portion 16 to which the skirt is secured, the portion 16 also supporting a sleeve member 17 secured thereto in any suitable manner as by the screws 18, an aperture 20 being provided within the sleeve member for admitting water thereto as the mine is launched.

The launching of the mine is shown in diagrammatic form on Fig. 1 in which various positions of the mine and the parachute during the launching operation are indicated by the letters A, B, C. D and E, the position A showing the mine just before the mine strikes the water and the position E, the mine at rest on the bed of the body of water with the parachute disconnected therefrom.

Figure 2:
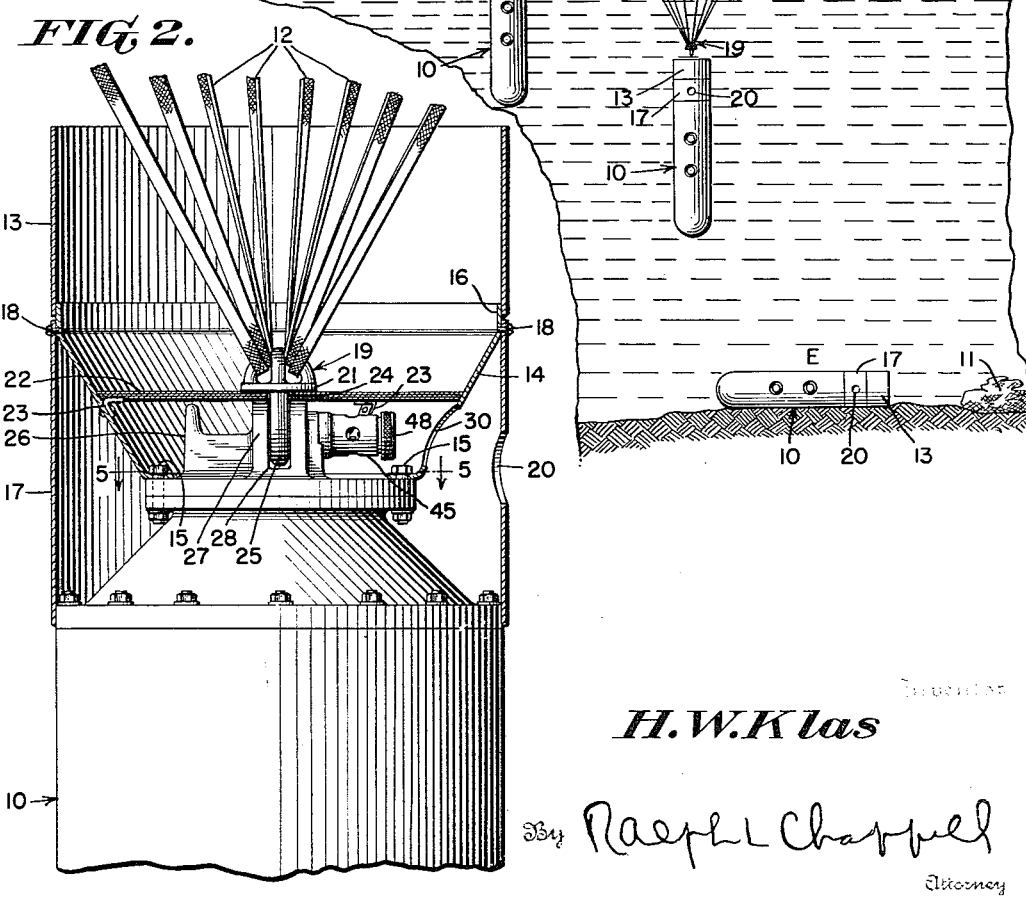
Figure 5:
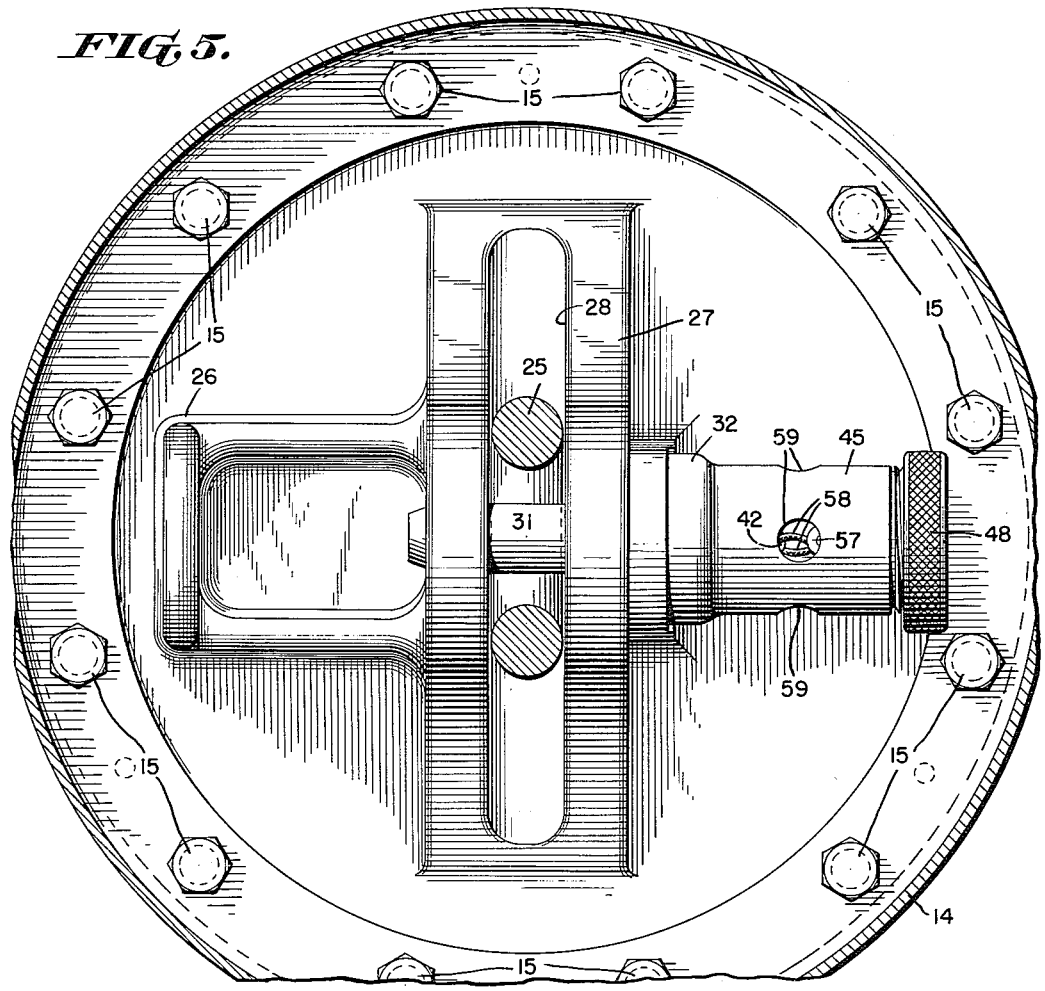
Figure 6:
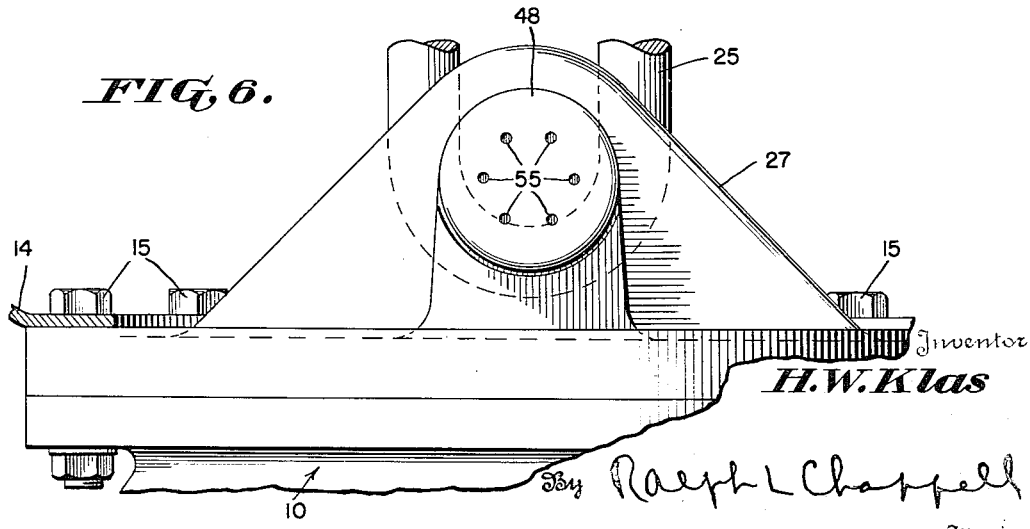

The shroud lines 12 are connected to an eye bolt 19 having a flange 21, Figs. 2 and 3, adapted to rest against a partition or wall 22 composed of material suitable for the purpose such, for example, as Bakelite and secured to the dish-shaped member 14 in a suitable manner by the brackets 23. The partition 22 is provided with a slotted portion 24 through which extends a U-shaped eye 25 on the eye bolt 19. There is secured to the end of the mine casing as by the bolts 15 a support 26 having an upstanding portion 27 slotted as at 28 to receive the eye bolt 19. The support 26 is provided with a transverse bore 29 within which is slideably arranged a retaining pin 31 whereby the eye bolt 19 is locked to the support 26 when the pin is in the assembled position. There is also provided a supporting member 32 in threaded engagement with the support 26 as at 33 and having a shoulder 34, Fig. 4, adapted to engage a complementary surface on the support 26 to insure a predetermined fixed spaced relation between the support 26 and the support 32 when the parts are in the assembled position.

The supporting member 32 is recessed as at 35 and provided with an elongated retaining member 36 secured thereto in any suitable manner as by the screw 37. One end of the member 36 is formed as at 38 and adapted to engage an annular groove 39 in the retaining pin 31 and thereby prevent the premature removal of the pin from an initial position in locking engagement with the eye bolt 19.

The supporting member 32 is provided with an annular recessed portion 41 in alinement with the bore 29 within which one end of the retaining pin 31 is slideably arranged, and a bore 40 in axial alinement with the recess 41 and adapted to receive an electro-responsive detonator 42 secured therein as by the screw 43. The bore 40 is in communication with a well 44 within the member 32 and having an enlarged cylindrical portion 45 adapted to receive a sea cell indicated generally by the numeral 46. The sea cell is clamped against a shoulder 47 within the well 44 by a cap 48 in threaded engagement with the member 32 as at 49. The sea cell may be of any type suitable for the purpose such, for example, as the type illustrated on Fig. 4 in which a plurality of anodes 51 composed preferably of silver coated with silver chloride and a plurality of cathodes 52 composed preferably of magnesium are enclosed within a cup-shaped member 53. A seal 54 composed of material suitable for the purpose such, for example, as sheet lead is employed to exclude moisture from the anode and cathode elements and prevent premature activation of the sea battery until the seal is ruptured by the force of the water entering a plurality of apertures 55 within the cap 48 as the mine enters the body of water within which the mine is planted. A quantity of desiccating material 60 suitable for the purpose such, for example, as silica gel, is preferably employed to absorb any moisture initially present within the well. The sea cell is provided with a pair of electrical terminals 56 and 57 in electrical connection with the detonator 42 as by the conductors 58 whereby the detonator is adapted to be fired in response to current generated by the sea cell as the anode and cathode elements thereof are activated by coming into contact with the sea water.

The supporting member 32 is preferably provided with a plurality of apertures 59 in communication with the well 44 thereby to provide an escape for the gases formed by the firing of the detonator 42 in the event that through accident or carelessness on the part of the personnel during the assembly of the device, the detonator should be prematurely fired and thus the force of the explosion will be dissipated sufficiently to prevent serious injury to the personnel.

The operation of the device will now be described: Let it be assumed, by way of example, that the mine 10 has been released from an aircraft in flight and the parachute 11 has opened. As the mine enters the body of water, water rushes into the sleeve member 17 through the aperture 20 provided therein, and through the apertures 30 within the member 14 and through apertures 55 within cap 48. The force of the water is sufficient to rupture the seal 54 thereby exposing the sea battery to the chemical action of the sea water. When this occurs the sea battery is activated thereby generating a voltage sufficient to fire the detonator 42 and expel the pin 31 from the support 26, the retaining member 36 being of insufficient strength to prevent the outward movement of the pin in response to the explosion of the detonator. The pin is thus blown clear of the U-shaped eye 25, thereby disconnecting the eye bolt 19 and the parachute from the mine, as shown at D on Fig. 1. The mine comes to rest on the bed of the body of water at E, Fig. 1, with the parachute disconnected therefrom.

Whereas in the preferred embodiment of the invention the pin 31 is releasably locked in an initial position by a yieldable retaining member 36 in engagement with an annular recess formed within the pin, it will be obvious that other arrangements may be employed for releasably retaining the pin in such initial position such, for example, as an arrangement comprising a plate or rod composed of glass or the like arranged in substantial abutting relation with the outer end of the pin and adapted to be broken by the pin as the detonator 42 is fired, thereby to effect the release of the pin.

Briefly stated in summary, the invention in its broader aspects contemplates the provision of a parachute release mechanism for a load adapted to be launched within a body of water in which the release of the parachute from the load is effected by firing a small explosive charge in response to the activation of a sea cell as the load enters the water and in which the premature activation of the sea cell and deterioration thereof by moisture is prevented. In accordance with the present invention means are also employed for preventing the premature release of the parachute releasing mechanism as a result of a shock or blow received during the handling or transportation of releasing mechanism and in which the force of a premature explosion of the aforesaid explosive charge is dissipated sufficiently to prevent serious injury to personnel.

While the invention has been described with reference to a particular example thereof which gives satisfactory results, it will be understood by those skilled in the art, after understanding the invention, that various changes and modifications may be made without departing from the spirit and scope of the invention and it is intended, therefore, in the appended claims to cover all such changes and modifications.

This invention may be manufactured and used by or for the Government of the United States of America without payment of any royalties thereon or therefor.

What is claimed as new and desired to be secured by Letters Patent of the United States is:

1. A mechanism of the character disclosed for releasing a parachute from a load as the load enters a body of water and comprisng two separable sections secured to the parachute and to the load respectively, means for releasably locking said sections together, electroresponsive explosive means for releasing said locking means when said explosive means is operated, a source of electrical energy adapted to be activated to operate said electroresponsive means as water is received by said source, and frangible means for excluding water from said source until the frangible means is ruptured as the load enters said body of water.

2. A mechanism of the character disclosed for releasing a parachute from a load as the load enters a body of water comprising a first section secured to a load and a second section secured to the parachute, a rod slideably arranged within said first section and in locking engagement with said second section for releasably locking the sections together, an electroresponsive detonator in substantial abutting spaced relation with respects to one end of said rod and adapted to eject the rod forcibly from locking engagement with said second section as the detonator operates, a sea cell operatively connected to said detonator and adapted to operate the detonator in response to the activation of the sea cell and frangible sealing means for preventing activation of the sea cell until the seal is ruptured as the load enters said body of water.

3. In a mechanism of the character disclosed for releasing a parachute from a load as the load enters a body of water, in combination, a fixed member secured to the load, a complementary member secured to the parachute, means for releasably locking said complementary member to said fixed member, a small explosive charge arranged within said fixed member in proximate spaced relation with respect to said locking means and adapted to actuate the locking means and thereby disconnect said complementary member from said fixed member, electroresponsive means for firing said explosive charge, a normally inactive sea cell disposed within said fixed member and adapted to operate said electroresponsive means in response to the activation of the sea cell and frangible sealing means for rendering said sea cell inactive until the sealing means is ruptured as the load enters said body of water.

4. In a mechanism of the character disclosed for releasing a parachute from a marine mine as the mine enters a body of water, the combination of means for releasably connecting the parachute to the mine, said means including a connecting member arranged for actuation from a locking position to a release position, a pistol adapted to actuate said member from said locking position to said release position as the pistol is fired, means including a voltage generating device for firing said pistol as the generating device is activated, said generating device being activated as water is received thereby, and frangible sealing means for preventing activation of said voltage generating device until the sealing means is ruptured as the mine is planted within said body of water.

5. In a mechanism of the character disclosed for releasing a mine from a parachute as the mine enters a body of water, the combination of a marine mine adapted to be launched from an aircraft, a support secured to said mine, a pin slideably arranged within said support for movement from an initial locking position to a release position, a complementary member secured to the shroud lines of said parachute and adapted to be locked to said support by said pin when the pin is in said initial locking position, means for releasably locking said pin in said initial position sufficiently to prevent the movement of the pin to said release position in response to a shock received by the mine prior to the launching thereof, a small explosive charge arranged within said support in substantial abutting relation with one end of said pin and for moving the pin to said release position as the charge is fired, means including a sea cell for firing said charge as the cell is activated by sea water and frangible sealing means on said sea cell for preventing activation thereof until the seal is ruptured as the mine enters said body of water.

6. In a release mechanism of the character disclosed for releasing a parachute from a load as the load enters a body of water, the combination of a pair of complementary members secured to the parachute and to the load respectively, means including a rod slideably arranged within one of said members for releasably locking said members together, an electroresponsive detonator arranged in proximate spaced relation with respect to one end of said rod for ejecting the rod forcibly from locking engagement with said members as the detonator operates, means including a sea cell arranged within said one of the members for operating said detonator as the sea cell is activated by sea water, and a frangible hermetic seal for preventing activation of said sea cell until the load enters said body of water and the seal is ruptured by the pressure of the water.

7. In a mechanism of the character disclosed for releasing a parachute from a load as the load enters a body of water, the combination of a pair of separable complementary devices secured to the parachute and to the load respectively, means including a pin slideably arranged within said devices for initially establishing a locking connection therebetween, explosive means for actuating said pin to a released position thereby to disconnect said pair of devices, electrolytic voltage generating means for firing said explosive means as moisture is admitted to said generating means, and frangible sealing means for excluding moisture from said generating means until the seal is ruptured as the load enters said body of water.

8. In a mechanism for releasing a marine mine from a parachute as the mine enters a body of water, the combination of a fixed support secured to the mine, an eye bolt secured to the shroud lines of the parachute, means including a slideable rod for releasably locking said eye bolt to said support, electroresponsive explosive means disposed within said support and adapted to eject said rod forcibly from locking engagement with said eye bolt when the explosive means is fired, a sea cell arranged within the support for firing said explosive means in response to activation of the sea cell, and frangible sealing means for rendering said cell dormant until the seal is ruptured as the mine enters said body of water.

References Cited in the file of this patent

UNITED STATES PATENTS

| | | |
|---|---|---|
| 1,300,413 | Kee | Apr. 15, 1919 |
| 1,531,550 | Glennon | Mar. 31, 1925 |
| 2,114,213 | Clauser | Apr. 12, 1938 |
| 2,371,640 | Manson et al. | Mar. 20, 1945 |

FOREIGN PATENTS

| | | |
|---|---|---|
| 299,625 | Germany | Sept. 13, 1919 |
| 532,841 | Germany | Sept. 11, 1931 |